United States Patent
Prange et al.

(10) Patent No.: US 9,708,899 B2
(45) Date of Patent: Jul. 18, 2017

(54) OPTIMIZATION OF A MULTI-PERIOD MODEL FOR VALUATION APPLIED TO FLOW CONTROL VALVES

(71) Applicant: SCHLUMBERGER TECHNOLOGY CORPORATION, Sugar Land, TX (US)

(72) Inventors: Michael David Prange, Somerville, MA (US); William J. Bailey, Somerville, MA (US); Dadi Wang, Montreal (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 448 days.

(21) Appl. No.: 14/351,519

(22) PCT Filed: Oct. 12, 2012

(86) PCT No.: PCT/US2012/059899
§ 371 (c)(1),
(2) Date: Apr. 11, 2014

(87) PCT Pub. No.: WO2013/059079
PCT Pub. Date: Apr. 25, 2013

(65) Prior Publication Data
US 2014/0257577 A1    Sep. 11, 2014

Related U.S. Application Data

(60) Provisional application No. 61/549,526, filed on Oct. 20, 2011.

(51) Int. Cl.
G05D 11/00 (2006.01)
E21B 44/00 (2006.01)
E21B 43/12 (2006.01)

(52) U.S. Cl.
CPC .............. *E21B 44/00* (2013.01); *E21B 43/12* (2013.01); *G01V 2210/663* (2013.01); *G01V 2210/665* (2013.01)

(58) Field of Classification Search
CPC ... B09C 1/02; G06F 17/5009; G06F 17/5022; E21B 43/00; E21B 7/04; E21B 49/00;
(Continued)

(56) References Cited

U.S. PATENT DOCUMENTS 6,549,854 B1 * 4/2003 Malinverno ........... G01V 1/282
367/73
7,054,752 B2    5/2006 Zabalza-Mezghani et al.
(Continued)

OTHER PUBLICATIONS

M. Murphy, "Advanced Oil recovery technologies for Improved recovery", Sep. 1998, 70 pgs <oil_Recovery_Murphy.pdf>.*
(Continued)

*Primary Examiner* — Tuan Vu

(57) ABSTRACT

Apparatus and methods for controlling equipment to recover hydrocarbons from a reservoir including constructing a collection of reservoir models wherein each model represents a realization of the reservoir and comprises a subterranean formation measurement, estimating the measurement for the model collection, and controlling a device wherein the controlling comprises the measurement estimate wherein the constructing, estimating, and/or controlling includes a rolling flexible approach and/or a nearest neighbor approach.

15 Claims, 10 Drawing Sheets

Small Bins

Big Bins

Figure 1A:
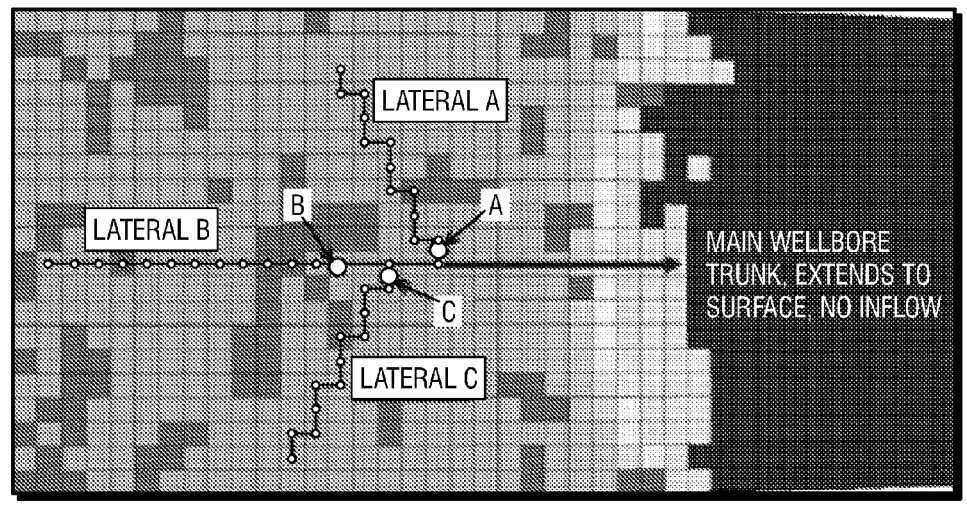

(58) Field of Classification Search
CPC .......... E21B 47/00; E21B 44/00; G01V 3/32; G01V 1/282; G01V 11/00; G01V 2210/663
See application file for complete search history.

(56) References Cited

U.S. PATENT DOCUMENTS

| | | | |
|---|---|---|---|
| 8,073,800 B2 | 12/2011 | Prange et al. | |
| 9,280,517 B2* | 3/2016 | Liu | G06F 17/10 |
| 2003/0196789 A1* | 10/2003 | Wellington | B09C 1/02 166/64 |
| 2004/0024578 A1* | 2/2004 | Szymanski | G06F 17/5009 703/17 |
| 2004/0065439 A1 | 4/2004 | Tubel et al. | |
| 2005/0149304 A1 | 7/2005 | Harris et al. | |
| 2005/0149307 A1* | 7/2005 | Gurpinar | E21B 43/00 703/10 |
| 2008/0077371 A1* | 3/2008 | Yeten | E21B 43/00 703/10 |
| 2008/0082469 A1* | 4/2008 | Wilkinson | E21B 43/00 706/13 |
| 2008/0133194 A1* | 6/2008 | Klumpen | E21B 49/00 703/10 |
| 2009/0271233 A1* | 10/2009 | Prange | E21B 47/00 706/46 |
| 2009/0314490 A1 | 12/2009 | Prange et al. | |
| 2010/0010744 A1* | 1/2010 | Prange | G01V 3/32 702/7 |
| 2010/0071897 A1 | 3/2010 | Liu et al. | |
| 2010/0163230 A1 | 7/2010 | Kotlar | |
| 2010/0185427 A1* | 7/2010 | Tilke | E21B 43/00 703/10 |
| 2011/0184713 A1* | 7/2011 | Yang | G06F 17/5022 703/13 |
| 2011/0307438 A1* | 12/2011 | Fernandez Martinez | G06N 7/005 706/52 |
| 2012/0253770 A1* | 10/2012 | Stern | G01V 11/00 703/10 |
| 2013/0140037 A1* | 6/2013 | Sequeira, Jr. | E21B 7/04 166/369 |

OTHER PUBLICATIONS

International Search Report of PCT Application No. PCT/US2012/059899 dated Mar. 25, 2013: pp. 1-2.
Kuchuk et al., "Determinatino of In Situ Two-Phase Flow Properties Through Downhole Fluid Movement Monitoring," SPE Reservoir Evaluation & Engineering, Aug. 2010: pp. 575-587.
Lagoudakis et al., "Reinforcement Learning as Classification: Leveraging Modern Classifiers," Proceedings of the Twentieth International Conference on Machine Learning (ICML-2003), 2003: pp. 1-8.
Langford et al., "Relating Reinforcement Learning Performance to Classification Performance," Proceedings of the 22nd International Conference on Machine Learning: 2005: pp. 473-480.
Singh et al., "Learning Without State-Estimation in Partially Observable Markovian Decision Processes," International Conference on Machine Learning, 1994: pp. 1-9.
Konopczynski, et al., "Design of Intelligent Well Downhole Valves for Adjustable Flow Control", SPE 90664, (2004) Society of Petroleum Engineers, Inc., 8 pp.
van Essen et al., "Optimization of Smart Wells in the St. Joseph Field", SPE 123563, (2009), Society of Petroleum Engineers, Inc., 10 pp.
Yeten, Burak et al., "Optimization of Nonconventional Well Type, Location and Trajectory", SPE 77565, (2002), Society of Petroleum Engineers, Inc., 14 pp.
Ebadi, F., et al., "Should 'Proactive' or Reactive Control be Chosen for Intelligent Well Management", SPE 99929 (2006) Society of Petroleum Engineers, Inc., 14 pp.
Bailey, et al., "Field Optimization Tool for Maximizing Asset Value", SPE 87026 (2004), Society of Petroleum Engineers, Inc., 10 pp.
Almeida et al, "Evolutionary Optimization of Smart-Wells Control Under Technical Uncertainties", SPE 107872 (2007) Society of Petroleum Engineers, Inc., 14 pp.

\* cited by examiner

Small Bins

Big Bins

Histogram of FOPR

Histogram of FWPR

Histogram of FGPR

Measurement is FWPR

Measurement is FGPR

Small Bins

Big Bins

Measurement is FOPR

OPTIMIZATION OF A MULTI-PERIOD MODEL FOR VALUATION APPLIED TO FLOW CONTROL VALVES

CROSS-REFERENCE TO RELATED APPLICATIONS

This application is a U.S. National Stage Application under 35 U.S.C. §371 and claims priority to Patent Cooperation Treaty Application Number PCT/US2012/059899 filed on Oct. 12, 2012, which claims the benefit of U.S. Provisional Patent Application Ser. No. 61/549,526 filed on Oct. 20, 2011, which is incorporated herein by reference in its entirety.

FIELD

This application relates to methods and apparatus to control and optimize flow control valves in the oil field services industry.

BACKGROUND

Figure 1B:
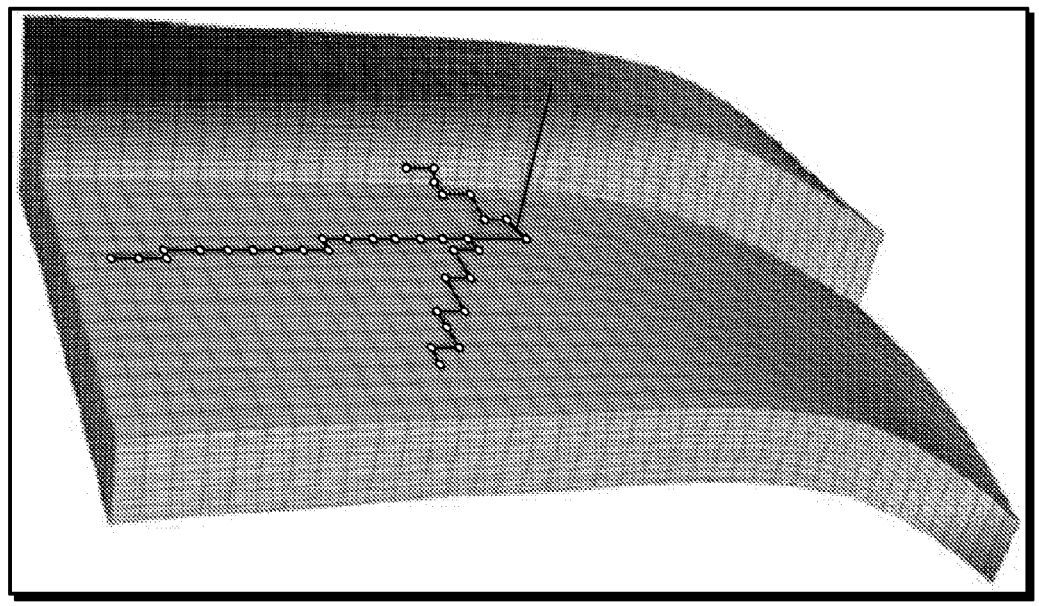

In the operation of oil wells, a critical issue is how to control the flow rate of oil such that revenue from the well is maximized. In long horizontal or multi-lateral wells, it may be advantageous to separately control rates in different parts of the well, e.g., to delay water incursions. Such control can be achieved through downhole flow control valves. The flow control valves (FCVs) are installed underground in wells to regulate the flow of crude oil. A typical example is shown in FIGS. 1A and 1B (prior art), where there are three horizontal boreholes in a well, with an FCV at the head of each borehole. In practice, operators closely monitor the geophysical properties of the well and dynamically adjust the FCVs such that maximum revenue from the well can be attained. Here we are concerned about expected revenue because the evolution of the geophysical nature of the well is a stochastic process, with grid, aquifer strength and oil-water contact as the uncertainty in the system. For a risk-neutral operator, the difference between the expected revenue of the well without FCVs and the expected revenue of the well with FCVs installed and optimally controlled with future measurements gives the value of the FCV itself. Our task is to find the optimal control strategy and hence the value of the FCVs.

There are two major obstacles before us, the curse of dimensionality and the non-Markovian property of the problem. To derive the optimal value, we model the downhole flow control problem as a dynamic programming problem and solve for the optimal control policy backwardly. In order to derive the maximum production, the operator has to be forward-looking in decision-making. The decision made in the current period will affect the measurements observed in the future and hence the decisions made in the future. The operator must therefore take future measurements and decisions into account when setting the valves in the current period. In other words, the operator learns from future information. The fundamental theory and standard computational technique for dynamic programming can be found in the literature. However, application of dynamic programming to real world problems is often hindered by the so-called curse of dimensionality, which means that the state space grows exponentially with the number of state variables. To get rid of this obstacle, various approximate methods have been proposed, and a detailed and comprehensive description can be found in the literature.

Another obstacle we face is the non-Markovian property of the problem. The payoff of the well is associated with the operation of valves and the successive measurements. It can be difficult/wrong to encode the payoff as a function of only current measurements, when the payoff depends on the system trajectory or history, and not on the current state alone. In other words, the payoff not only depends on the current measurements and valves setting, but also on previous measurements and valve settings. This non-Markovian property of the problem poses a major difficulty in the valuation problem, since previous actions enter into the problem as the states for later periods, exacerbating the curse of dimensionality effect. Theoretically, to exactly solve a non-Markovian problem, we need to enumerate all possible settings for FCVs and, under each possible setting, we generate the evolution of geophysical properties and revenue by simulation. After all possible results have been obtained, we can search for the optimal value using standard backward induction. While this method is straightforward and accurate, it is hardly feasible in reality due to its immense computational demand. Consider the case in FIG. 1. Even for a simplified case where the FCVs are adjusted only three times throughout the life of the well, it took us a couple of months to generate all those simulations on a small Linux cluster. In fact, if we use eight Eclipse grids, three time periods, four settings for each valve, fixed setting for one valve, two aquifer strength samples, three oil-water contact samples, we need a total of 8×4×(42)3×2×3=786,432 Eclipse simulations. If each simulation takes an average of four minutes, it would require 2184 days to complete all simulations on a single computer. Detailed discussion of the optimal policy in this three-period model is presented in Section 2.

FIGURES

FIGS. 1A and 1B (PRIOR ART) provide an example of previous methods.

Figure 2:
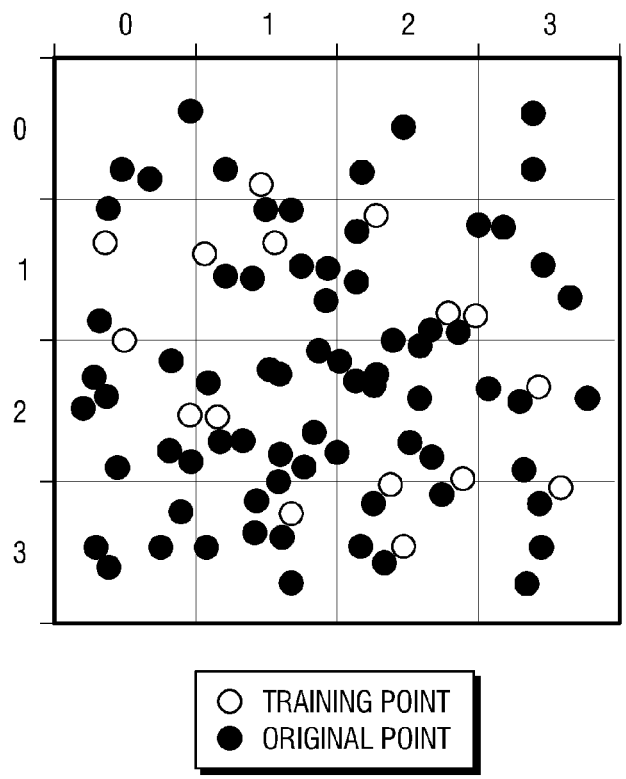

FIG. 2 is a plot of data from a training set.

Figure 3:
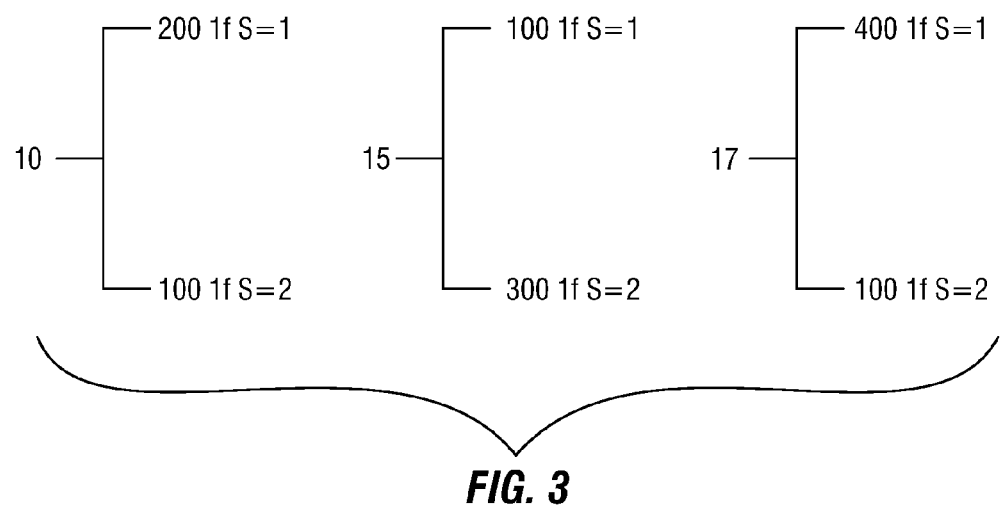

FIG. 3 is an example of valuation of a single flow control valve. This example illustrates that using smaller bins does not necessarily earn the operator higher values. This FIG. 3 relates to FIG. 9 below.

Figure 4:
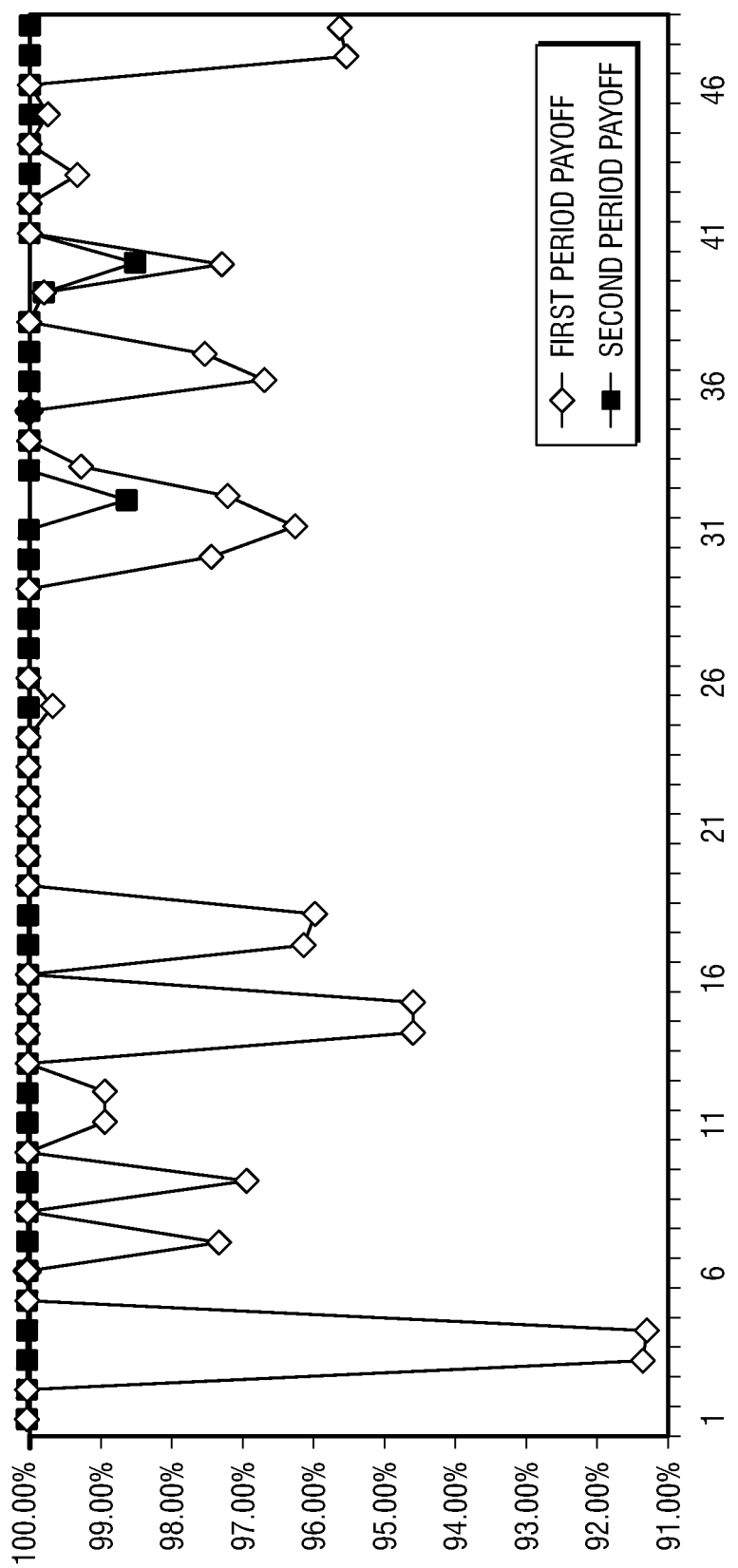

FIG. 4 is a plot of payoff as a function of time.

Figure 5A:
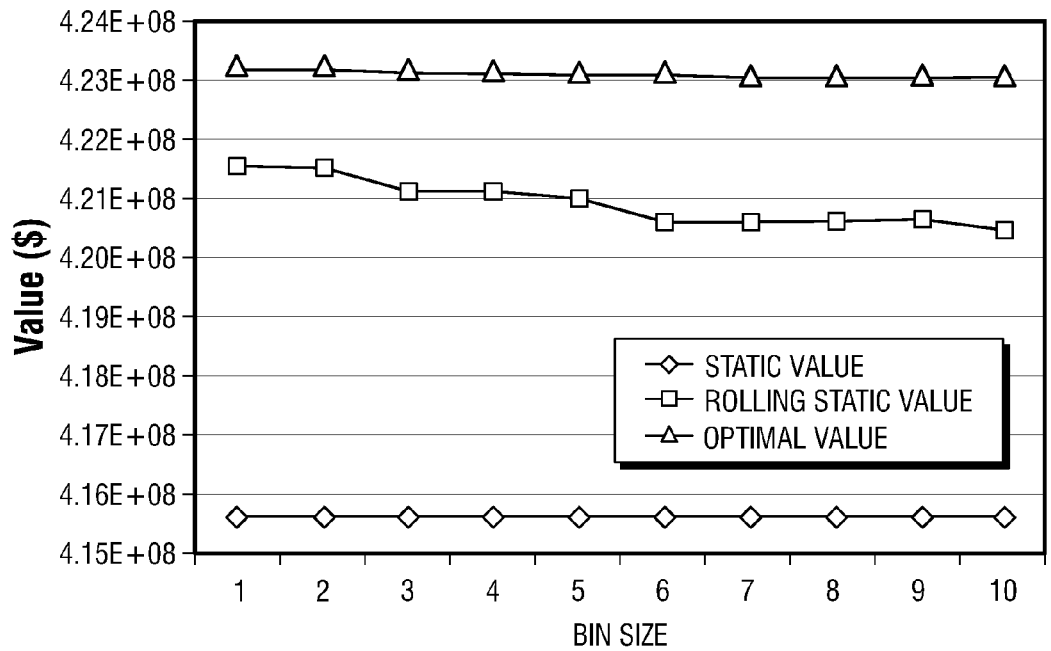
Figure 5B:
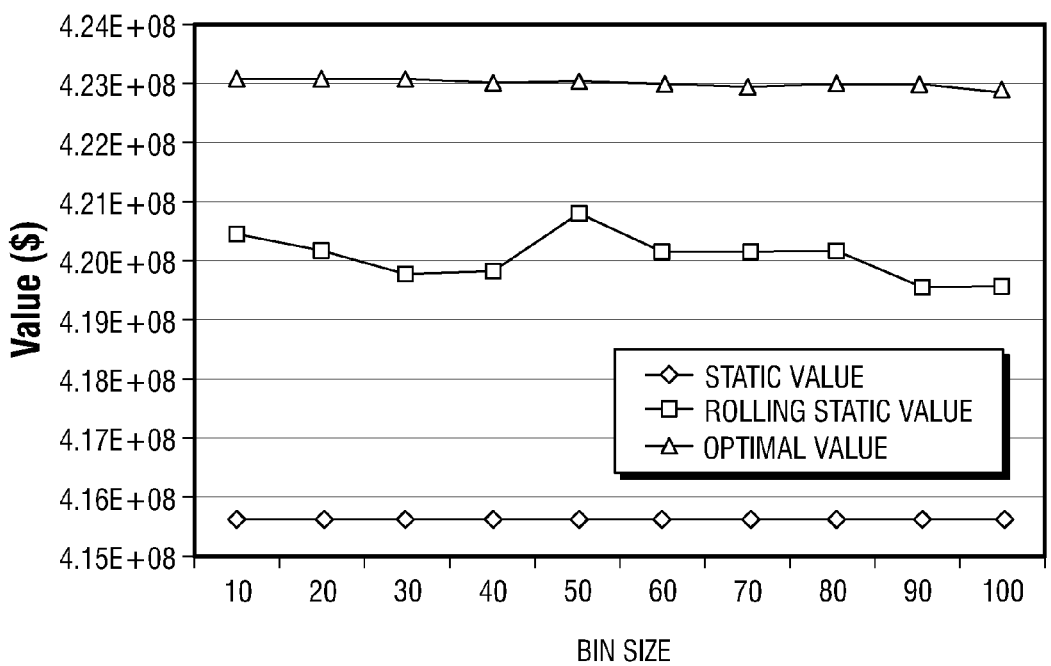

FIGS. 5A and 5B illustrate the performance of the rolling-static policy under different bin sizes. We use hierarchical clustering to group measurements together. We use three measurements in the computation: FOPR, FWPR, and FGPR. When the bin size is 1, the optimal value is $423.18M while the value generated by the rolling-static policy is $421.56M.

Figure 6A:
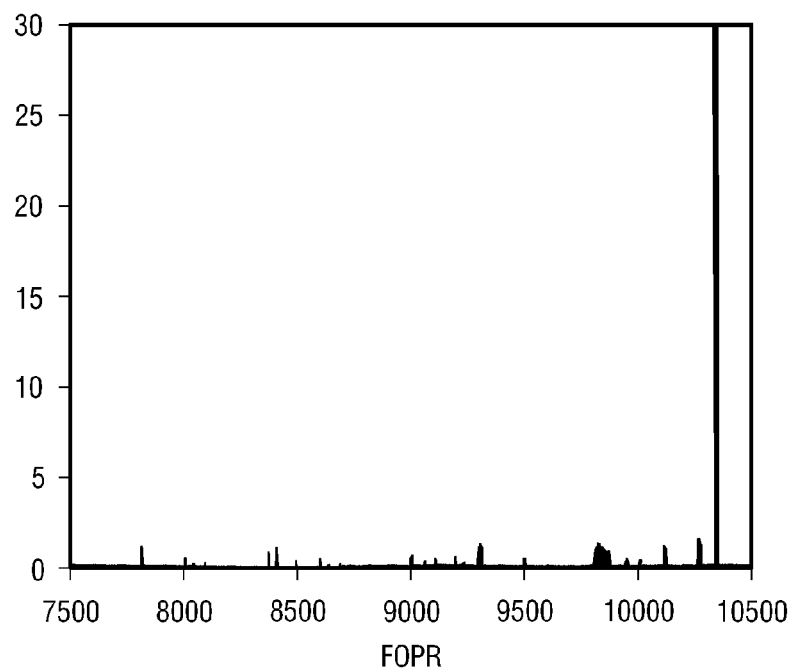
Figure 6B:
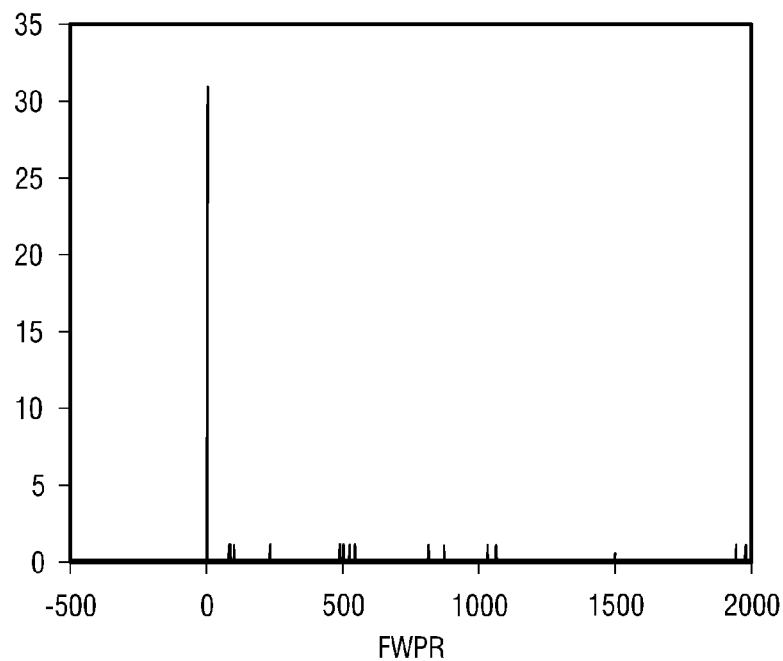
Figure 6C:
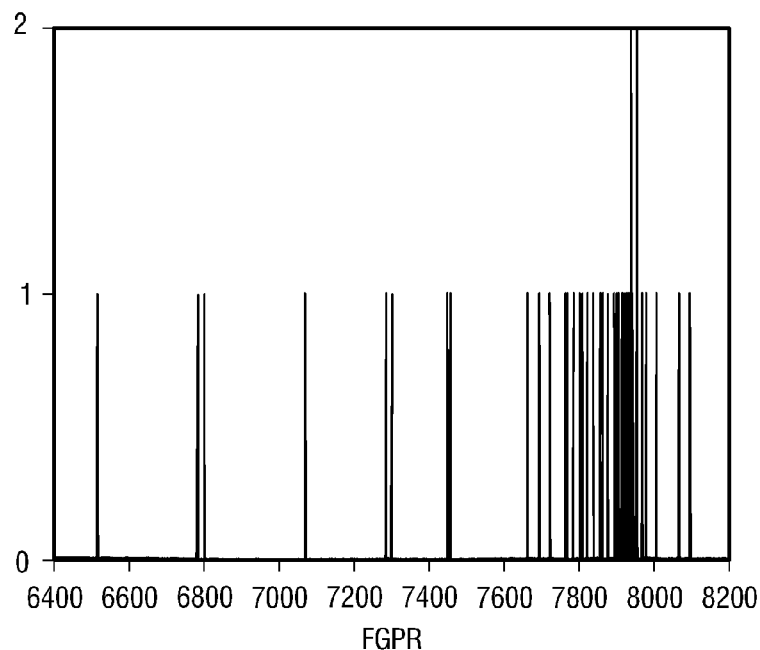

FIGS. 6A, 6B, and 6C provide histograms of measurements t=1 under rolling-static strategy.

Figure 7A:
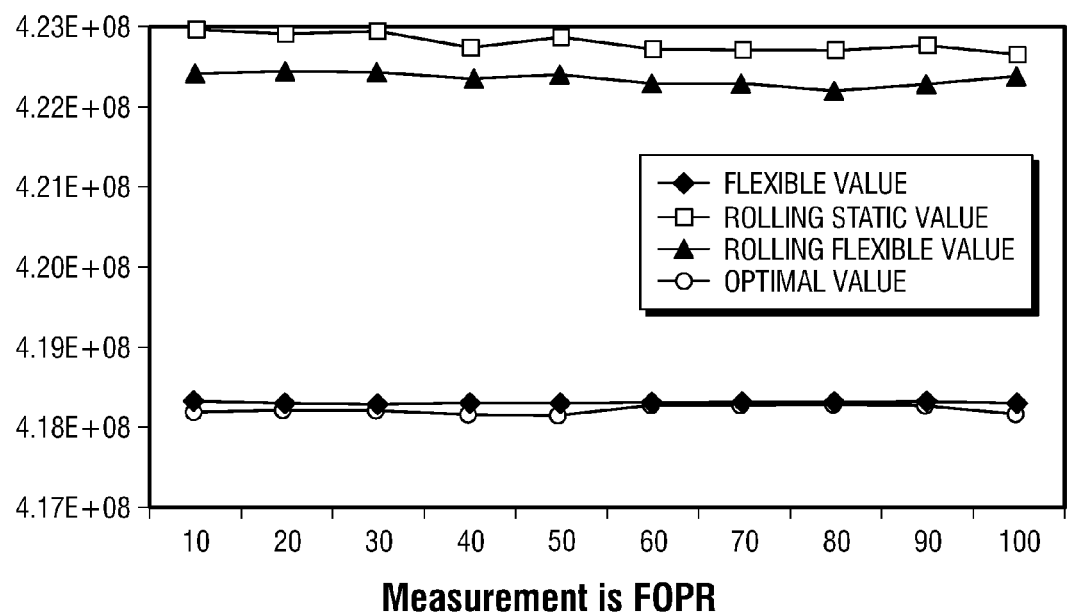
Figure 7B:
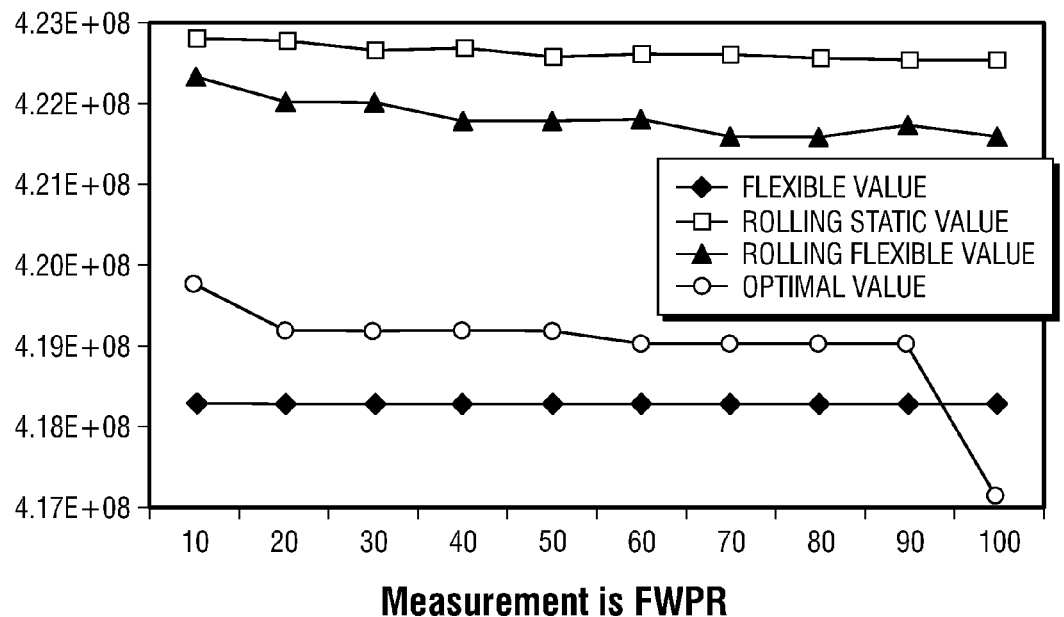
Figure 7C:
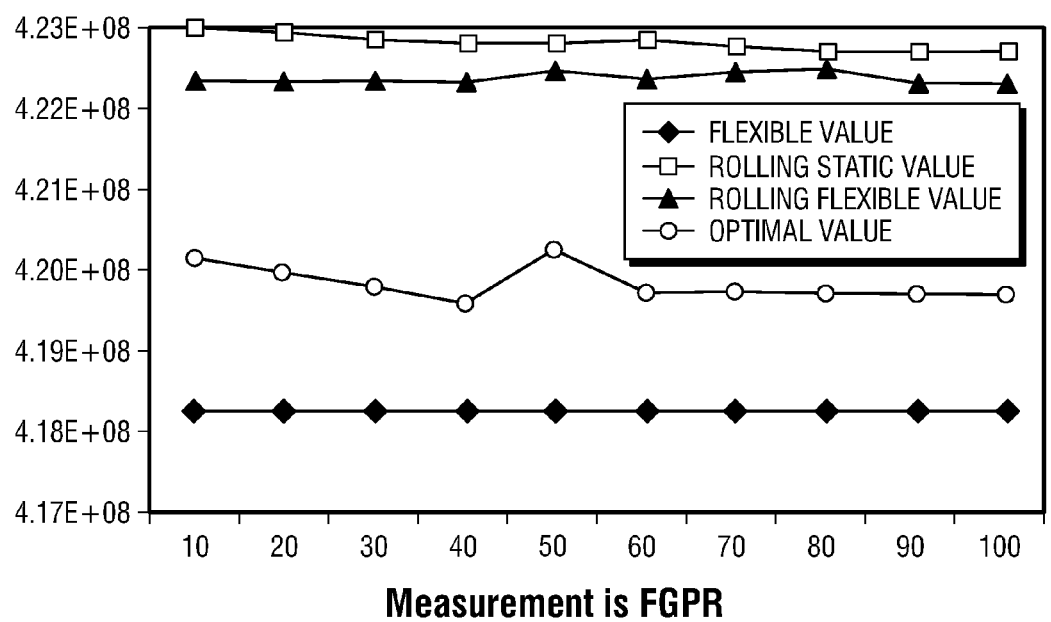
Figure 7D:
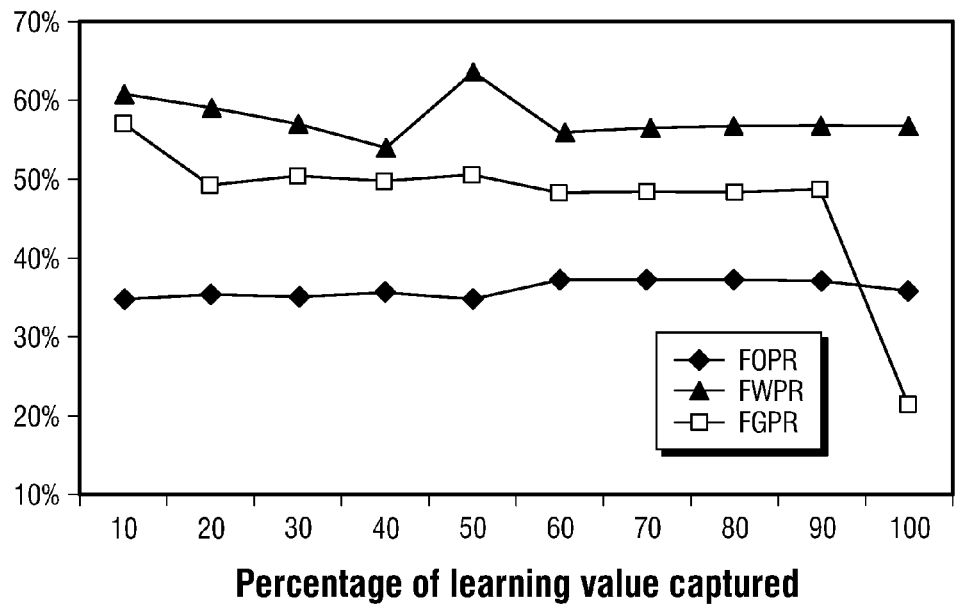

FIGS. 7A, 7B, 7C, and 7D compare different measurements under the rolling-static strategy. FIG. 7D shows the percentage of learning value captured under different measurements. The percentage of learning value captured is defined as $(V^{rs}-V^s)/(V^o-V^s)$.

Figure 8A:
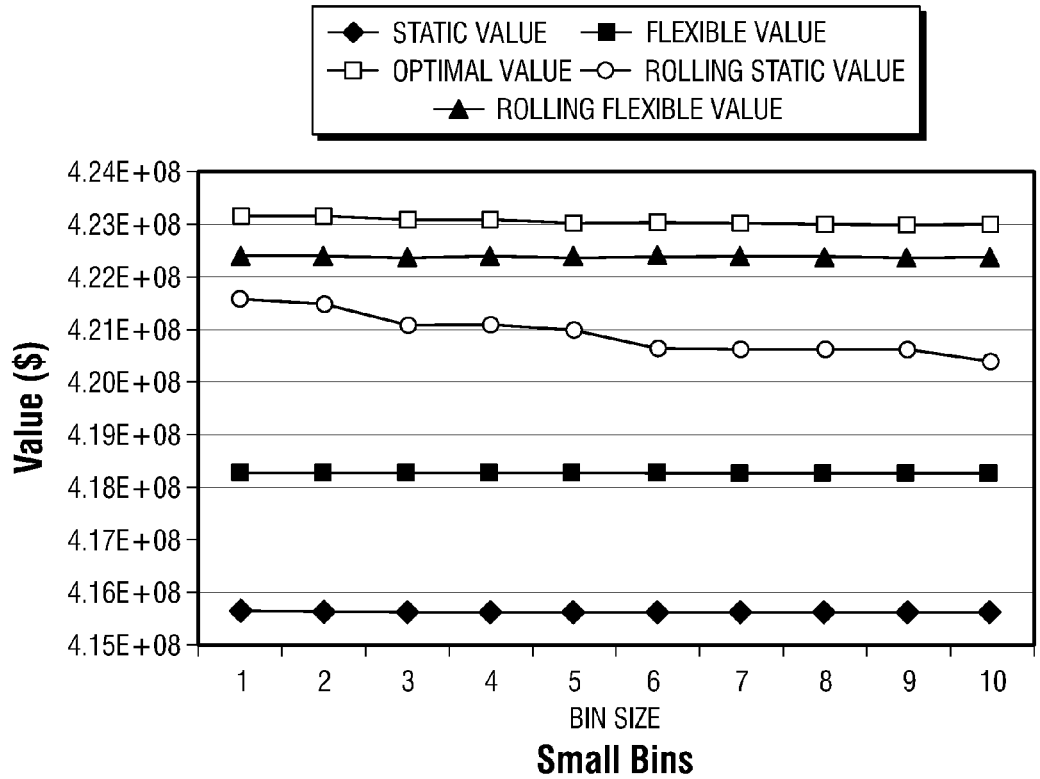
Figure 8B:
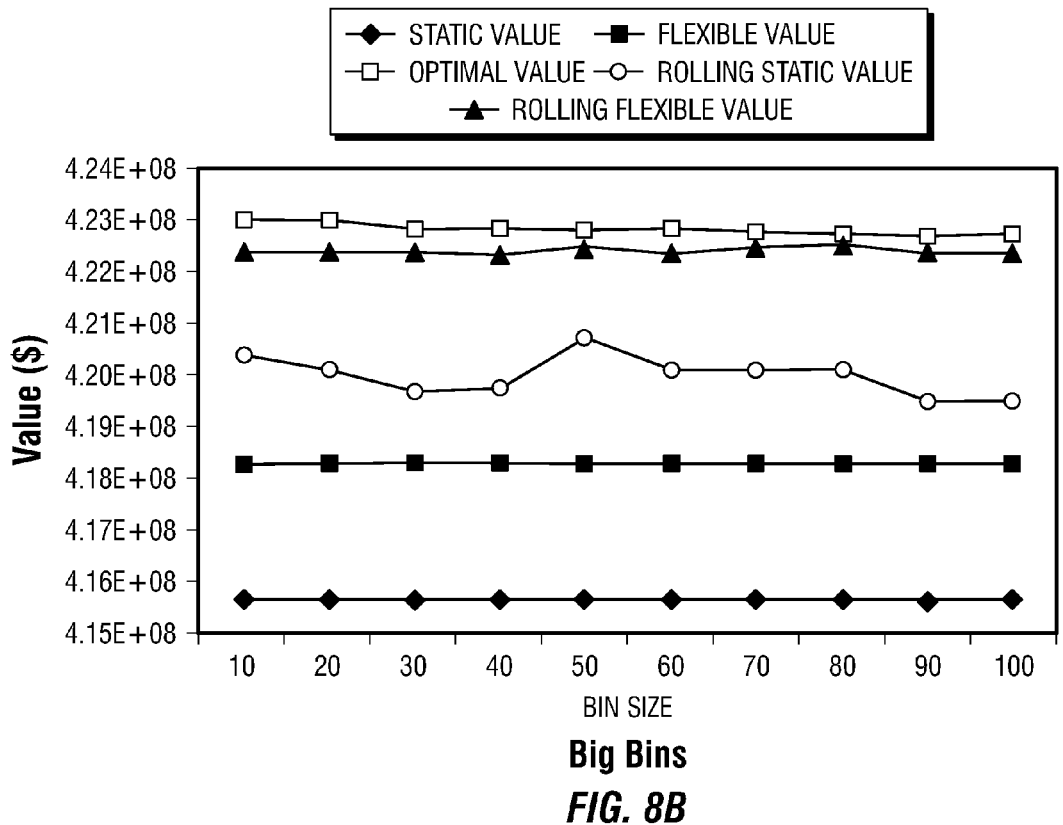

FIGS. 8A and 8B show the performance of the rolling-flexible policy under different bin sizes. We use hierarchical clustering to group measurements together. We use three measurements in the computation: FOPR, FWPR, and FGPR. When the bin size is 1, the optimal value is $423.18M while the value generated by the rolling-flexible policy is $422.39M.

Figure 9A:
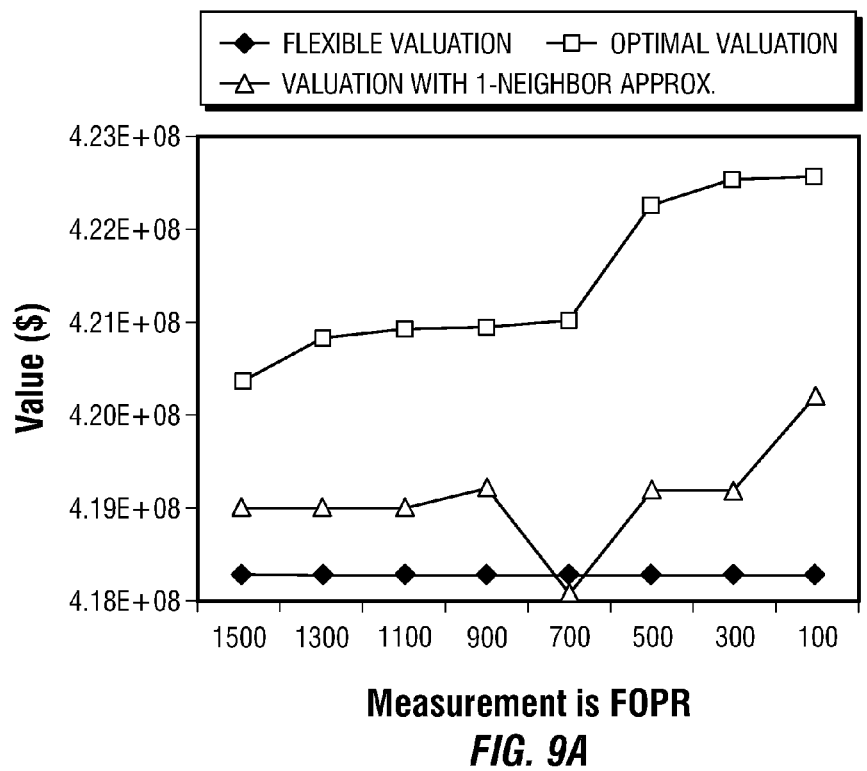
Figure 9B:
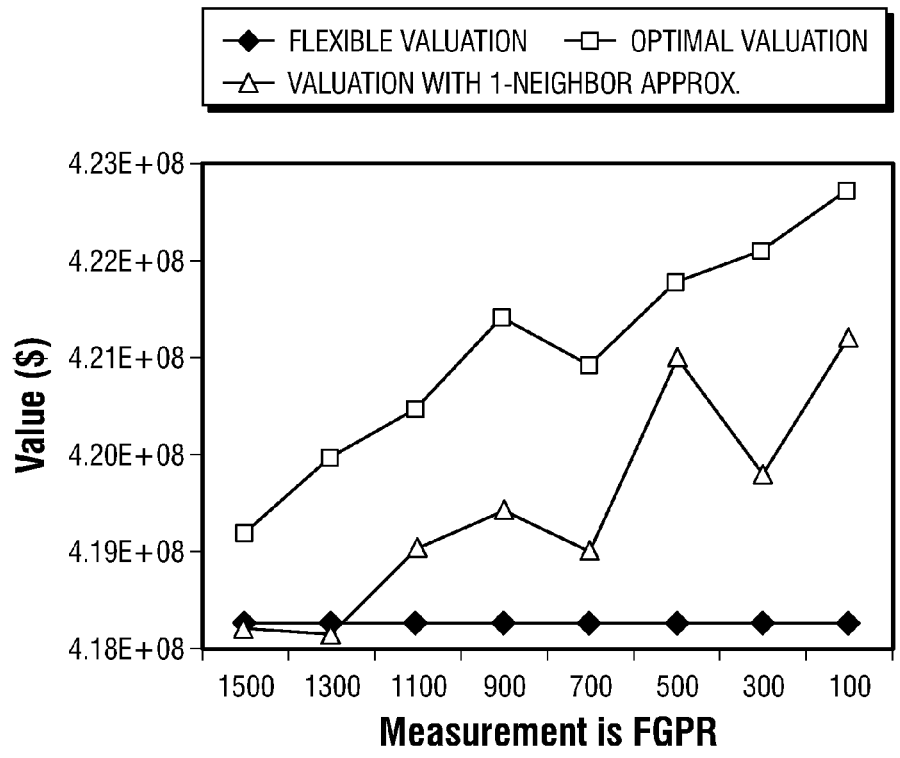

FIGS. 9A and 9B compare flexible valuation, optimal valuation, and 1-neighbor approximate valuation. Here we plot the different valuation strategies for different bin sizes. FIG. 9A shows the results with learning from FOPR. FIG. 9B shows the results with learning from FGPR. In the 1-Neighbor approximation approach, the set T requires 12,288 simulation scenarios. The scenarios are chosen such that $s_{22}=3-s_{21}$, $s_{32}=3-s_{31}$, and $s_{23}=3-s_{22}$. The total number of simulations needed by the 1-Neighbor policy is 49,152, including the T-set simulations. This is 93.5 percent fewer than in optimal valuation.

Figure 10:
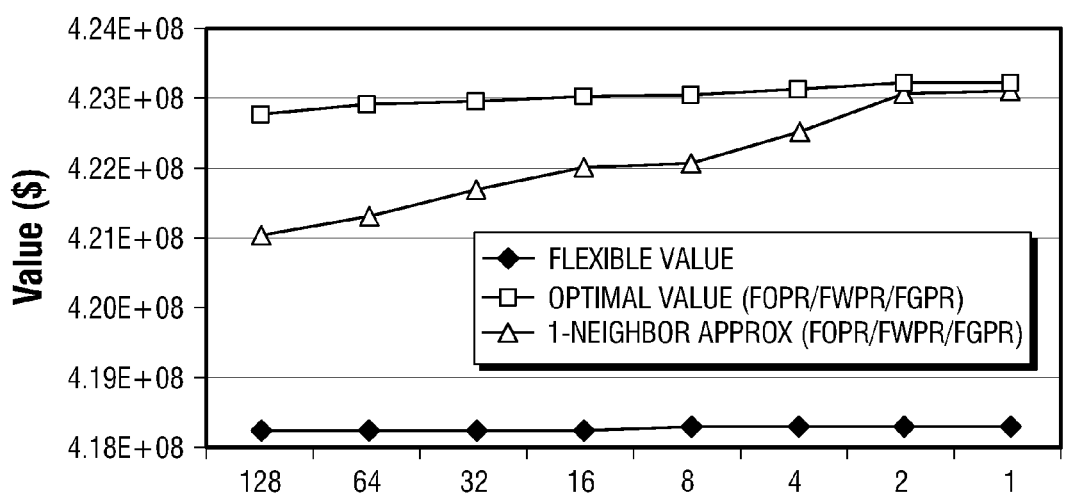

FIG. 10 provides 1-Neighbor approximation valuation with small bins. In this 1-Neighbor approximation approach, the set T contains 12,288 simulation scenarios. The scenarios are constructed such that $s_{22}=3-s_{21}$, $s_{32}=3$. The total number of simulations needed by the 1-Neighbor policy is 49,152, including the T-set simulations. This is 93.5 percent fewer than in optimal valuation.

SUMMARY

Embodiments herein relate to apparatus and methods for controlling equipment to recover hydrocarbons from a reservoir including constructing a collection of reservoir models wherein each model represents a realization of the reservoir and comprises a subterranean formation measurement, estimating the measurement for the model collection, and controlling a device wherein the controlling comprises the measurement estimate wherein the constructing, estimating, and/or controlling includes a rolling flexible approach and/or a nearest neighbor approach.

Some embodiments use a simulator for estimating and/or an optimizer for controlling the device. In some embodiments, the optimizer resets the measurements and operates in a rolling fashion.

In some embodiments, the controlling flow rates includes a decision resolution. In some embodiments, the estimating includes the decision resolution, a basis-function regression and/or a k-neighbor approach.

In some embodiments, the geophysical measurements are surface sensors, downhole sensors, temporary sensors, permanent sensors, well logs, fluid production, well tests, electromagnetic surveys, gravity surveys, nuclear surveys, tiltmeter surveys, seismic surveys, water, oil, or gas flow measurements, and/or separated or combined flow measurements.

Some embodiments also include flooding with oil, gas, water, or carbon dioxide, EOR, static or controllable downhole valves, well placement, platform type and placement, drilling, heating the formation, or geosteering.

DETAILED DESCRIPTION

The long-term expected oil production from a well can be optimized through real-time flow rate control. Ideally, operators can dynamically adjust the flow rates by setting downhole flow control valves conditional on information about geophysical properties of the well. The valuation of flow-control valves must take into account both the optimization problem and the future measurements that will be used to guide valve settings. The optimization of flow rate can be modeled as a dynamic programming problem. However, it is impractical to solve for the optimal policy in this model due to the long time horizon in reality and the exponentially growing state space. To tackle the problem, we use several approximate approaches and demonstrate the performance of these approaches in a three-period model. We present the standard dynamic programming approach to derive the optimal policy below. Approximate policies are also discussed below, where our focus is on the discussion of two approximate approaches.

We test these policies under various situations and show there is a significant value in adopting approximate approaches. Furthermore, we compare these approaches under different situations and show under which condition approximate approaches can achieve near-optimal performance. Among all approaches discussed, the rolling-flexible approach and the nearest neighbor approach stand out for their computational efficiency and performance.

The valuation of production optimization through real-time flow control can be formulated as a dynamic programming problem. However, the numerical solution of this problem is nearly always computationally intractable because of the huge computational complexity for problems of realistic size. In order to solve this problem, we studied a set of approximate optimization policies with application to an example FCV problem whose size allowed the optimal solution to be computed for comparison with the various approximations. Among these strategies, the rolling-flexible and the 1-neighbor approximation policies are most effective with respect to our example problem. The rolling-flexible policy achieves nearly optimal results for a broad range of bin sizes with a 92 percent reduction in required simulations over the optimal policy. The 1-neighbor policy has at 93.8 percent reduction in required simulations over the optimal policy, but demonstrated acceptable accuracy only when the bin size was very small.

Other findings are summarized as follows and are provided in more detail below.

Using smaller bins (higher decision resolution) generally, but not always, leads to higher valuation.

In the k-neighbor policy, setting k=1 usually results in the best performance.

The 1-neighbor policy with learning from a single measurement outperforms the fixed valuation for most scenarios.

Using more measurements results in equal or higher values. This is true for both optimal valuation and approximate valuation. The valuation is highest when all three measurements FOPR/FWPR/FGPR are taken into account.

The 1-Neighbor approach provides the lower bound of the optimal value.

In order to solve this predicament, we use several approaches to approximately derive the value of an FCV installation in an efficient and time-manageable manner. In terms of the usage of measurements, these approaches can be divided into two groups, those using measurements and those not using measurements. The first group of approaches does not involve any learning. Approaches in this group include the wide-open policy, the static policy and the optimal non-learning policy. The second group of approaches involves learning from measurement information, including the rolling-static policy, the rolling-flexible policy, the nearest neighbor policy and the feature-based policy. The rolling-static and rolling-flexible policies are based on their non-learning counterparts, the static and optimal nonlearning policies. The nearest-neighbor and the feature-based approaches are more advanced methods. While these two approaches are different in implementation, they are driven by the same motivation; instead of searching for the optimal FCV settings, $\pi$, by enumerating all possible simulation scenarios in set L, we generate a significantly smaller set of simulation scenarios T. We search for the optimal FCV control strategy $\pi$ in this smaller set T of scenarios and apply this strategy to value the FCV installation. In other words, we estimate the optimal strategy using incomplete data. The two approaches vary in the structure of the estimator. The first approach is non-parametric and is based on the K-Neighbor method. In the second approach, we approximate the optimal setting by a linear combination of basis functions.

In terms of the target of approximation, there are two streams of approximate dynamic programming methods: value function approximation and policy approximation. The value function approximation usually tries to decompose the value function as a linear combination of a few basis functions, thus overcoming the curse of dimensionality. Our approximate method employs the policy approximation instead of value function approximation. The reason is that the policy approximation method yields a lower bound for simulation-based valuation and facilitates comparison among different approaches. Furthermore, our tests of the value function approximation method show that its performance is not as promising.

There are two approaches among the approaches mentioned above that merit closer attention, the rolling-flexible approach and the nearest-neighbor approach. In the application of the rolling-flexible approach, we first fix the FCV settings across different periods and run the optimizer to find the best setting. We apply the best setting we found for the current period and use the simulator to generate the measurement for the next period. Given the measurement, we reset the settings by running the optimizer again. In other words, we run the optimizer in a rolling fashion. This process continues until we reach the last period. This rolling-flexible approach features the following aspects.

First, instead of solving the dynamic programming problem in a backward fashion, it optimizes in a forward manner. While there are forward approaches in dynamic programming in previous literature, these approaches assume that we are fully aware of the dynamics of the state. However, in our approach, we do not have to use any information about these dynamics. In the numerical part, we replace the optimizer by using the optimized results from full enumeration that had previously been computed in order to evaluate the optimal dynamic programming policy most widely used distance in classifiers is the Euclidean distance. However, when there is a large number of data points, finding the nearest neighbors in terms of Euclidean distance can be extremely cumbersome. In this paper, we propose a novel way to find nearest neighbors based on a specific definition of distance.

The nearest-neighbor policy approximation is essentially a classifier-based approximation. Lagoudakis and Parr use a support vector machine (SVM) as the classifier for Markov decision processes. Langford and Zadrozny describe a classifier-based algorithm for general reinforcement learning problems. The basic idea is to leverage a modern classifier to predict the value/policy for unknown states. However, none of these references explore the nearest-neighbor approach. Moreover, our nearest-neighbor approach depends on a special way of defining the distance between states.

According to this method, we rank states by first coding them as multi-digit numbers and then applying the comparison rule of multi-digit numbers. The distance between two states is defined as the difference of indexes in the table. This method does not involve complex calculations and nearest neighbors can be found very easily. Numerical study indicates this nearest neighbor approach provides excellent approximation in some situations. Clearly, this nearest-neighbor approximate approach can be extended to other dynamic programming problems.

An important step in solving the problem is the binning of measurements. Although measurement variables are typically continuous, we need to bin them to evaluate expectations when making decisions. Valves are adjusted based on the measurements, but presumably one would not change settings based on an infinitesimal change in the measurements. The measurement change must be large enough to motivate the decision maker to adjust valve settings. This change threshold is called the decision resolution. It is impacted in part by the measurement resolution, but also by the "inertia" against making a change. This decision resolution determines the bin size to be used in our approach. Valve-control decisions are not directly based on the absolute measurements, but on the bins the measurements fall in. Smaller bins mean that we are more confident in making valve changes based on smaller changes in the measurements. We investigate how the bin size affects the valuation under different strategies.

The rest of the application is organized as follows. First, we illustrate the backward induction approach for valuation which is only suitable when we can afford to simulate valves for all uncertainties and control states. The value thus derived is the optimal value and serves as the benchmark for our approximate approaches. Next, we describe several approaches that derive the value approximately, including one approach that is based on basis-function regression and another that utilizes the k-neighbor approach in machine learning. Finally, we test these methods, compare their performances, and summarize the results.

Backward Induction

This section describes the standard method used for valuation, which works not only for a complete enumeration of the simulation state space but for an incomplete set as well. For the complete set, the value derived is the true optimal value and will be used as the benchmark subsequently. Understanding how the simulation results are used under this methodology may also help us to design a better optimization.

We study an (N+1)-period model with w FCVs installed in a well. Each FCV has g possible settings. The FCVs are set at $t=0, 1, \ldots, N-1$, measurements are taken at $t=1, \ldots, N-1$, and final payoff of the well is realized at $t=N$. Note that no information about uncertainty has been disclosed when the FCVs are set at time 0. We use a vector $St=[s_{it}, \ldots, s_{wt}]^T$ to denote the setting decisions of all w FCVs at t, and a vector $A_{ft}$ to denote all measurements collected at t. Further, let $H_t = \{(S_o, M_1, S_1, \ldots, M_t)\}$ denote the set of historical settings and measurements up to t. Decision $S_t$ is made conditional on a specific history $h_t \in H_t$. The optimal strategy $\pi$ is a mapping, $\pi: H_t \to S_t$. Let U denote the uncertainty factors in simulation, including oil-water contact, aquifer strength, and the simulation grids containing samples of porosity and permeability.

A dynamic programming algorithm is developed to maximize the expected value of the well using backward induction. Let $V_t(h_t)$ denote the expected final payoff conditional on history $h_t$ at time t. The algorithm follows.

At time N−1, given history $h_{N-1} \in H_{N-1}$, we search for the optimal setting $S^*_{N-1}$ such that the expected value at N−1 is maximized, $$V_{N-1}(h_t) = \max_{S_{N-1}} E_U[V_N(h_N)], \quad (1)$$

where $h_N=(h_{N-1}, S_{N-1})$ and $V_N(h_N)$ is the final value generated by simulation for the scenario $h_N$ at N.

At t, given $h_t \epsilon H_t$, we search for the optimal setting $S^*_t$ such that the expected value at t is maximized, $$V_t(h_t) = \max_{S_t} E_{M_{t+1}}[V_{t+1}(h_{t+1})], \qquad (2)$$

where $h_{t+1}=(h_t, S_t, M_{t+1})$ and the function $V_{t+1}(h_{t+1})$ has been already obtained from the last step in induction.

Finally at t=0, we search for the optimal setting $S_0^*$ such that the expected value is maximized, $$V_0 = \max_{S_0} E_{M_1}[V_1(h_1)], \qquad (3)$$

where $h_1=(S_o, M_1)$.

As we can see, the above method is a general method. It can compute the optimal control strategy and optimal value for any data set. When the data set is complete, it yields the true optimal value; when the data set is incomplete, it yields the control strategy and value for the incomplete set, which may be suboptimal for the complete set.

Approximation Policies

To compute the exact optimal value is time-consuming because simulations under all possible settings are required. We first consider some basic approximate approaches. Later, we consider two advanced approximate approaches. Consistent throughout this numerical study, our test case is based on a three-period model, with eight Eclipse grids, three time periods, four settings for each valve, fixed setting for one valve, two aquifer strength samples, three oil-water contact samples. Thus, in order to derive the exact value, we need a total of $8 \times 4 \times (4^2)^3 \times 2 \times 3 = 786{,}432$ Eclipse simulations to sample each state.

Policy 1: Wide Open Policy (No Learning)

We optimize under the condition that all FCVs are wide open throughout the life of the well. We need to run 48 simulations to obtain the value of vwo:

$$V^{wo}=E_U(V(S_0,M_1,S_1,M_2,S_2)|S_0=S_1=[3,3,3]^T).$$

Policy 2: Static Policy (No Learning)

We optimize the expected payoff under the condition $S_o=S_1=S_2$, i.e., the settings are static throughout the time, but can differ between valves. To derive the static policy, we need to run $48 \times 64 = 3072$ simulations to fully evaluate all relevant states, or an optimizer may be used to reduce the number of evaluations. Denote the value of $V^s$ by $$V^s = \max_a E_U\{V(S_0, M_1, S_1, M_2, S_2) | S_0 = S_1 = S_2 = a\}.$$

Policy 3: Flexible Policy (No Learning)

Different from the static policy, where the settings remain the same through-out the time, the flexible policy allows the settings to change from period to period. But the setting is fixed within a single period. To derive the flexible policy, we need to run all 786,432 simulations, or an optimizer may be used to reduce the number of evaluations. Denote the value $V^f$ by the following.

$$V^f = \max_{a_0,a_1,a_2} E_U\{V(S_0, M_1, S_1, M_2, S_2) | S_0 = a_0, S_1 = a_1, S_2 = a_2\}.$$

Policy 4: Rolling-Static Policy (Learning)

We dynamically adjust the static settings in order to account for learning from measurements. At t=0, we solve the problem by searching for the optimal setting $S_0^*$ under the condition $S_0=S_1=S_2$. This is the same optimization as in the static (no learning) policy. At t=1, conditional on the setting of $S_0^*$ and the measurements forecast at t=1 by the simulator, we re-optimize for the remaining two periods under the static condition $S_1=S_2$. Finally at t=2, conditional on previous settings and measurements forecast up to t=2, we search for the optimal setting of $S_2$. The number of simulations required depends on how we bin the measurements. We can derive an upper bound on the number of required simulations under the condition of no binning as $48 \times 64 + 48 \times 16 + 48 \times 16 = 4608$ simulations.

Denote the rolling-static valuation, $V^{rs}$, by $$V_0^{rs} = \max_{a_0} E_U\{V(S_0, M_1, S_1, M_2, S_2) | S_0 = S_1 = S_2 = a_0\},$$

denoting the optimal setting as $a_0^*$;

$$V_1^{rs} = \max_{a_1} E_U\{V(a_0^*, M_1, S_1, M_2, S_2) | S_1 = S_2 = a_1\},$$

denoting the optimal setting as $a_1$;

$$V_2^{rs} = \max_{a_2} E_U\{V(a_0^*, M_1, a_1^*, M_2, S_2) | S_2 = a_2\},$$

denoting the optimal setting as $a_2^*$;

$$V^{rs} E_U V(a_0^*, M_1, a_1^*, M_2, a_2^*),$$

Policy 5: Rolling-Flexible Policy (Learning)

Here, we dynamically update the flexible policy to account for learning from future measurements. At t=0, we solve the problem by searching for the optimal setting $S_0^*$ as in the flexible policy. At t=1, conditional on the setting $S_0^*$ and measurements forecast at t=1 by the simulator, we re-optimize for the remaining two periods according to the flexible policy. Finally, at t=2, conditional on previous settings and the measurements forecast up to t=2, we search for the optimal setting of $S_2$. An upper bound on the required number of simulations is 786,432, equal to simulating all possibilities in the state space. In practice, an optimizer would be used to carry out each optimization and re-optimization step, thus reducing the number of required simulations at the expense of perhaps missing the globally optimal solution at each step. Denote the rolling-flexible valuation, $V^{rf}$, by $$V_0^{rf} = \max_{a_0,a_1,a_2} E_U\{V(S_0, M_1, S_1, M_2, S_2) | S_0 = a_0, S_1 = a_1, S_2 = a_2\},$$

denoting the optimal setting as $a_0^*$;

$$V_1^{rf} = \max_{a_1,a_2} E_U\{V(a_0^*, M_1, S_1, M_2, S_2) | S_1 = a_1, S_2 = a_2\},$$

denoting the optimal setting as $a_1^*$;

$$V_2^{rf} = \max_{a_2} E_U\{V(a_0^*, M_1, a_1^*, M_2, S_2) | S_2 = a_2\},$$

denoting the optimal setting as $a_2^*$;

$$V^{rf} E_U V(a_0^*, M_1, a^{1*}, M_2, a_2^*).$$

The optimal policy is based on backward induction, which provides the exact solution to the valuation problem. Unfortunately, this policy is computationally impractical ("Curse of Dimensionality") because it requires an enumeration over the entire state space, resulting in the expensive reservoir simulator being run over every possible uncertainty case and valve setting. In our limited example, this required 786,432 simulations but the limitations imposed by the need to make this a practical number of simulations made this example an impractical representation of the real-world decision problem at hand. Even a modest improvement allowing 10 decision periods and 10 valve settings enlarged the number of simulation cases to over 1023, grossly impractical from a computational point of view. However, as a limiting case, this exact solution, denoted by $V^o$, can be used to denote the maximum value we aim to achieve in our approximation policies.

The above approximate policies, excluding the optimal policy, can be divided into two categories: those with re-optimization and those without re-optimization. The wide-open policy, static policy, and flexible policies are in the former category, and the rolling policies (that re-optimize in each period conditional on new information) are in the latter.

Lemma 1

We have the following relationships among different values:

$$V^{wo} \leq V^s \leq V^f \leq V^{rf} \leq V^o \text{ and } V^s \leq V^{rs} \leq V^o. \quad (4)$$

Lemma 2 The expected payoff generated by the rolling-static policy never decreases, e.g., the expected final payoff conditional on the second {resp. third} period information is no less than the payoff conditional on the first {resp. second} period payoff.

Proof.

The proofs of Lemmas 1 and 2 follow directly from the definitions of these policies.

In this section, we describe two advanced approximation approaches based on the notion that in order to estimate the FCV control strategy for all simulations, one can derive a strategy derived from a small set of states (simulations) and then apply this strategy to the full set of states. We assume H denotes the set of simulations under all possible states and 1r denotes the optimal strategy for adjusting the valve settings. Let $T \subset H$ denote the set of simulations we have already obtained and that will be used to estimate future decisions. We derive a strategy $\bar{\pi}$ from the set T and then approximate $\pi$ from $\bar{\pi}$. If $\|T\| \ll \|H\|$, we will be able to significantly reduce the number of required simulations.

Specifically, suppose we have obtained the set T of m scenarios by simulation. What we need to do is to find some strategy ft from the above scenarios, perhaps by using backward induction, and then use it to approximate it from which we can approximate the optimal solution using backward induction. Assume a new (m+1)th scenario $h_{N-1,m+1} = (S_{o,m+1}, \ldots, M_{N-1,m+1})$ has been generated and our objective is to find optimal setting $S^*_{N-1,m+1}(h_{N-1,m+1})$ from our approximate strategy $\bar{\pi}$. There are $w^g$ possible settings for $S^*_{N-1,m+1}$ that would need to be considered, and the conventional backward induction method requires that we find the optimal setting by enumerating all $w^g$ settings. In the approximate approach, we choose the optimal well setting according to $S^*_{N-1,m-1} = f(\bar{\pi}, T, h_{N-1, m+1})$, where f is the estimator function that estimates the optimal control $S_{N-1,m+1}$ based on T and $\bar{\pi}$. There are various ways to design the estimator f. Here we propose two different estimators, a feature-based approach and a non-parametric approach.

Feature-Based Approach

Several references provide a detailed description about the feature-based approach. In a typical dynamic programming problem, the size of a state space normally grows exponentially with the number of state variables. Known as the curse of dimensionality, this phenomenon renders dynamic programming intractable in the face of problems of practical scale. One approach to dealing with this difficulty is to generate an approximation within a parameterized class of functions or features, in a spirit similar to that of statistical regression. In particular, to approximate a function $V^*$ mapping the state space to reals, one could design a parameterized class of functions $\tilde{V}$, and then compute a parameter vector r to fit the cost-to-go function, so that $\tilde{V}(., r) \approx V^*(.)$ The method described above is the conventional approach. Different from the conventional approach where the cost-to-go function is approximated by linear combination of basis functions, we approximate the decision instead. The reason is that value should be obtained from simulation rather than approximation. In other words, linear approximation is employed and f can be written as $$f(\bar{\pi}, T, h_{N-1,m+1}, r) = \sum_{k=1}^{K} r_k \phi_k(\bar{\pi}, T, h_{N-1,m+1}),$$

where each $\phi$ is a "basis function" and the parameters r1, ..., rk represent basis function weights. Given the linear approximation scheme, we just need to simulate for certain decisions and derive the weights $r_k$ through least square method. Then, the decisions for other scenarios can be approximated by a linear combination of basis functions. Possible choices of basis functions include polynomial, Laguerre, Hermite, Legendre, and Jacobi polynomial.

The Non-Parametric Approach

This method requires no model to be fit. Given a query scenario $h_{N-1,m+1}$, we approximate $S_{N-1,m+1}$ from the optimal decisions made on the k nearest scenarios in T. To begin with, let us focus on decisions at the last period t=N−1. For a given history $h_{N-1} \in H_{N-1}$, there are 16 possible settings for the two active valves: $S_2 \in \{(0,0), \ldots, (3,3)\}$. This approximation approach is schematically illustrated in FIG. 2. Each point in the figure represents a distinct scenario. The red points mark the optimal decisions made for scenarios in T. If a point falls into a square, it means that the optimal setting $S^*_{N-1}$ is given by the horizontal and vertical axes of the square. The blue points correspond to approximate solutions that were identified based on the optimal solutions of their k nearest neighbors in T. In other words, we know the history for each red point and its optimal decision $S^*_{N-1}$ and, based on what we know about the red points, we need to develop a strategy to value all the blue points. For the blue points, instead of testing all 16 possible settings, we run the simulation for the chosen setting directly. Now the number of simulations required is about 1/16 of the original enumeration method. A natural question is how to define the distance between two scenarios $h_{N-1,i}$ and $h_{N-1,j}$. Such details are discussed in more detail below.

In the non-parametric approach, the mapping f is treated non-parametrically. Here we focus on the local regression method, where $f(S_o, M_1, S_1, M_2)$ is fitted by using those observations close to the target point $(S_o, M_1, S_1, M_2)$. This method, in a general form, is as follows.

$$\hat{f}(S_0, M_1, S_1, M_2) = \sum_{i=1}^{N} w_i S_2^i, \quad (5)$$

where $S^i_2$, indicates the optimal setting for the i-th points in T, and $W_i$ is the weight of that setting. The weight is determined by a kernel method, i.e., for points $x_o=(S_o, M_1, S_1, M_2)$ and $x_i=(S^i_O, M^i_1, S^i_1, M^i_2)$, the kernel is $$K(x_o, x_i) = D(|X_o - X_i|), \quad (6)$$

where $|x_o - x_i|$ is the distance between the two points, and $D(\ )$ is a function of the distance. The weights are then defined by $$w_i = \frac{K(x_0, x_i)}{\sum_{i=1}^{N} K(x_0, x_i)}. \quad (7)$$

Cross Validation

In the description of both methods, we take some parameters as exogenous, e.g., the set of the basis functions and the number of neighbors used. In a robust algorithm, instead of using exogenous parameters, we should fit those parameters to the model. Further, given a small set of simulation results, we would like to estimate how accurately our method can recover the optimal policy. The simplest and most widely used approach to addressing these two issues is cross-validation.

Ideally, if we have enough data, we would set aside a validation set and use it to assess the performance of the valuation model. In the K-fold cross-validation, we split the training set T into K roughly equal-sized parts. For the k-th part, we fit the model to the other K−1 parts of the data and calculate the prediction error of the fitted model when predicting the k-th part of the data. We do this for k=1, 2, . . . , K and combine the K estimates of the prediction error. We choose the weights such that the prediction error is minimized. Please refer to the literature for detailed description of cross validation.

Numerical Results

Data

The simulation data set is generated by a simplified three-period model. We use eight Eclipse grids, three time periods, four settings for each FCV, fixed setting for one specific FCV after the first period, two aquifer strength samples, three oil-water contact samples. The data set consists of a complete enumeration and valuation of the state space, namely $8 \times 4 \times (4^2)^3 \times 2 \times 3 = 786,432$ Eclipse simulations, with 62 data entries in each scenario. Among the entries in each scenario, one element is the scenario index, three elements represent the simulation environment, seven elements represent the control, and the remaining are the simulation measurements. The measurements are taken at three dates after well operation starts: 600 days, 1200 days, and 2400 days, while the FCVs are set at time 0, 600 days and 1200 days. Note that at time 0, no information has been disclosed when valves are set. For notational convenience, we use $t \in \{0, 1, 2, 3\}$ to represent 0, 600, 1200 and 2400 days after operation starts. Valves are set at t=0, 1, 2 immediately after measurements are made, except for t=0. The i-th (i=1, 2, 3) valve at time t has four possible settings, $s_{i,t} \in \{0, 1, 2, 3\}$, where 0 means closed, 3 means fully open, and 1 and 2 are intermediate states. To reduce the state space, we have imposed the simplification that $s_{11}=s_{12}=s_{13}$, i.e., once valve 1 is set in period 1, it will remain in that setting at all later times. We use a vector $S_t$ (t=0, 1, 2) to denote the aggregate setting of all three valves at t, and a vector $M_t$ (t=1, 2, 3) to denote all measurements taken at t.

Methodology

We employ the following valuation strategies that were initially described above: the wide-open policy, the static policy, the flexible policy, the rolling-static policy, the rolling-flexible policy, the optimal dynamic policy, the k-nearest-neighbor policy and the feature-based policy. The difference between the valuation achieved with the optimal dynamic policy (a learning-based approach) and the flexible (non-learning) policy represents the value of learning. The approximate learning-based approaches are presented here as more practical proxies for the optimal dynamic policy, with the goal of demonstrating that an approximate policy can achieve valuation results close to the optimal value.

Measurement Binning

Although measurement values typically belong to the class of real numbers, we discretize each measurement by aggregating similar measurement values into bins such that all measurements in the same bin are considered to be equal. We then compute the valuation based on these binned measurements.

Another aspect of binning is the connection between the number of states in a bin and the remaining uncertainty at that juncture of the decision tree. If a particular bin contains only one measurement at t=t*, then the sequence of decisions and measurements for t≤t* have completely resolved all uncertainty for that state for all t>t*. This complete solution of uncertainty based on a limited set of measurements is artificial in the sense that it is only possible because of the finite set of states being used to represent all uncertainty in the problem.

Here, we consider two approaches for doing this binning. The simplest approach is to divide the space of measurements into equal-sized intervals and then assigning all measurements within each interval to the same bin. A disadvantage of this approach is that when measurements possess a natural clustering pattern, the measurements composing a cluster may be artificially divided into different bins, even if the bin size is large enough to accommodate all of the cluster within a single bin. An alternative approach is to perform cluster analysis, in which the measurement values are divided into natural clusters with respect to proximity and the maximum range of measurement values within each bin. When decisions are made based on multiple measurements, cluster analysis is done on each measurement separately. We use hierarchical clustering analysis to bin the measurements according to the given decision resolution. Specifically, we do cluster analysis on the measurements and adjust the clusters until the size of the biggest cluster is smaller than the bin size.

We demonstrate that the concept of using smaller bins always leads to higher valuation is not true through the following counter-example. We consider the valuation of a single valve based on the three scenarios shown in FIG. 3. There are three possible measurement values $\{10, 15, 17\}$. The valve has two possible settings $S \in \{1, 2\}$. For each setting, the payoff is shown at the end of the branch.

Consider two possible bin sizes, 4 and 6. If bin size is 4, then the three scenarios can be grouped in terms of the measurement as {10} and {15, 17}. The optimal setting is 1 for both {10} and {15, 17}. Taking the three scenarios as being equally likely, the expected payoff from these three scenarios is 700/3. If the bin size is 6, then the scenarios can be grouped as {10, 15} and {17}. The optimal setting is 2 for {10, 15} and the optimal setting is 1 for {17}. The expected payoff is 800/3. Hence the payoff under bin size 6 is higher than the payoff under bin size 4. It is easy to see that other groupings are possible for the above two bin sizes in this example, and these lead to different payoffs.

Attention to the binning issue is important for achieving consistent valuation. Bins essentially specify a partition $H=H_1 \cup H_2 \cup \ldots \cup H_m$ of the state space. As indicated by the counterexample, a new partition $H=H'_1 \cup H'_2 \cup \ldots \cup H'_n$ with $n \geq m$ does not necessarily correspond to higher valuation. However, if the new partition $\cup^n_{i=1} H'_i$ is a refinement of $\cup^m_{i=1} H_i$ (i.e., every element of $\{H_i\}_{i=1}^m$ is a subset of some element in $\{H'_i\}^n_{i=1}$), then it does lead to higher value. The use of appropriate clustering algorithms that lump together measurements with a proximity priority should serve to preserve this refinement condition, thus leading to more consistent valuation.

Advanced Approximation Methods

In both k-neighbor and the feature-based valuation, we need to choose simulation scenarios to construct the set T. We then derive a strategy $\pi$ based on T. The construction of T is a critical step since a proper choice of T can result in better approximation. To derive the optimal value, we still need to generate some (but not all) scenarios out of H. Specifically, for a given history $(S_o, M_1, S_1, M_2)$, there are 16 possible settings for $S_2$. To compute the optimal value in the conventional approach, we must obtain all 16 scenarios corresponding to the 16 different settings. In the approximation approach, we just pick one setting $S'_2$ and run a single simulation $(S_o, M_1, S_1, M_2, S'_2)$. How $S'_2$ is chosen is based on what we know about $(S_o, M_1, S_1, M_2)$, T and $\pi$. The number of scenarios we need is $\|T\|+\|H-T\|/16$. Also note that, by definition, the approximate value is always lower than the optimal value and serves as a lower bound. The k-neighbor algorithm is outlined in Table 1.

The critical issue in the approximation approach is how to define the "distance" among the simulation scenarios. We first arrange simulation scenarios in an ordered table according to the following rule. A scenario $(S_o, M_1, S_1, M_2, S_2)$ is treated like a "multi-digit number" with $S_o$ being the first digit and $S_2$ being the last digit. We compare another scenario $(S'_o, M'_1, S'_1, M'_2, S'_2)$ to $(S_o, M_1, S_1, M_2, S_2)$ in the spirit of number comparison: if $S_o > S'_o$, then we say $(S_o, M_1, S_1, M_2, S_2) > (S'_o, M'_1, S'_1, M'_2, S'_2)$ and insert $(S'_o, M'_1, S'_1, M'_2, S'_2)$ before $(S_o, M_1, S_1, M_2, S_2)$; if $S_o < S'_o$, do the opposite. If $S_o = S'_o$, we move forward and compare the next digit $M_1$ and $M'_1$. This procedure is repeated until the ordering relationship is determined. After the table is obtained, the "distance" between two scenarios is then defined as the difference between their positions in the table. This definition of "distance" assigns more weights to early settings and measurements. A natural question is, when we face a decision-making problem in later periods, how can we use scenarios with similar elements in early periods to estimate the setting? We demonstrate below that not only does this strategy work well, but there is also a sound explanation behind it.

Results

The valuation results of the 7 policies are summarized in Table 2. The numbering is in order of increasing valuation, with the first three policies being non-learning policies of increasing control complexity, and the last four policies benefiting from learning from the three co-mingled measurements of FOPR, FGPR, and FWPR. Note that these latter four policies may all be thought of as providing approximations of the optimal learning value, with the approximation complexity (number of required simulations) increasing with the policy number. In this section, we describe the results of the latter four policies in more detail.

Rolling-Static Policy

While the optimal policy requires that all possible model states be simulated in order to perform the valuation using the backward-induction algorithm, the rolling-static policy requires only forward optimization with a static forward model of the future valve states. This greatly reduces the number of required simulations, in this case to ≤4608 simulations. The number of simulations has its maximal value when the state space is exhaustively searched for the optimal value, but further savings can be achieved when an optimizer is used to seek the optimal value using fewer simulations.

FIG. 4 shows the performance of the rolling-static policy on each of the 48 prior models as a progression over the first and second period time steps. Note that the optimal value is achieved on the first time step on many of the models. For the remaining models, the value at each step improves monotonically with successive time steps, consistent with Lemma 2.

The performance of the rolling-static policy versus bin size, when learning from the measurements FOPR, FGPR and FWPR, is illustrated in FIG. 5. For comparison, valuation curves are provided for the static and optimal policies. Note that the rolling-static valuation generally, but not strictly, increases with decreasing bin size. As an approximation of the optimal policy, the rolling-static policy recovers between about 50% and 80% of the value of the optimal policy, depending on bin size, with a better level of approximation provided with smaller bin sizes.

So far, we have examined the validity of the rolling-static approximation versus bin size. Another aspect of valuation is to determine which measurements add the most value to the FCV installation. FIG. 6 shows the histograms of the reservoir simulator output parameters FOPR, FWPR, and FGPR under the rolling-static policy at t=1 when there is no binning. The prior uncertainty in the model is described by the 48 reservoir model configurations discussed previously. Under the rolling-static policy at t=1, the optimum $S_O$ has already been set, resulting in 48 possible measurements at t=1. Measurements that vary widely at early times with respect to the prior model uncertainty are better at resolving model uncertainty because each measurement bin will contain only a few models, meaning that there is less uncertainty in the next step of the algorithm. Conversely, measurements whose values cluster tightly into a few small bins have resolved little model uncertainty. Since the distribution of FGPR, shown in FIG. 6, is less concentrated compared to FOPR and FWPR, it should contribute more value to the FCV installation, and thus is the measurement upon which to focus.

The valuation of the individual measurements using the rolling-static policy is illustrated in FIG. 7 along with valuations for the flexible, rolling-flexible and optimal policies. As anticipated, the FGPR measurement achieves the highest valuation under the rolling-static policy. The rolling-static policy also predicts that FOPR provides no additional value above that predicted by the non-learning flexible policy and provides an intermediate valuation for FWPR.

However, an examination of the optimal valuation curves for these three measurements shows that the measurement valuation provided by the rolling-static policy is spurious, even when considered in a relative sense. With the optimal policy (the exact solution), all three measurements add about $4.5×106 to the non-learning valuation. This indicates that the rolling-static policy cannot be trusted to provide accurate measurement valuation, even in a relative sense.

Rolling-Flexible Policy

The rolling-flexible policy is an extension of the rolling-static policy that allows the optimizer a bit more freedom in choosing the best valve-adjustment strategy based on learning. While in the rolling-static policy the optimizer holds all of the future valve states to be equal to the valve states chosen for the current time step, the rolling-flexible policy allows these future valve states to be free to be adjusted to achieve the best possible valuation. The resulting valuation for single measurements versus bin size is plotted in FIG. 7. The rolling-flexible policy surmounts all of the deficiencies identified above in the rolling-static policy, and captures most of the value in the optimal policy. The rolling-flexible valuation for three combined measurements versus bin size is further explored in FIG. 8, where it is clear that this policy captures most of the value of the optimal policy over a broad range of bin sizes.

The rolling-flexible policy is clearly superior to the rolling-static policy in all but one aspect, namely, that it requires many more simulations than the rolling-static policy. In the worst-case scenario in which the optimization is done using full enumeration of the state space, the rolling-flexible policy requires full enumeration of the entire state space (768,432 simulations), while the rolling-static policy enumerates a reduced state space (4,608 simulations). In practice, one would use an optimizer that explores the state space more efficiently, and thus the actual number of simulations incurred during optimization would be much smaller. However, this reduction is achieved with the possible consequence of finding a suboptimal solution.

An alternative to the rolling-flexible policy that reduces the state space to be explored during optimization is what we call a rolling-flexible-k policy. In this policy, only valve states up to k steps in future are allowed to be flexible during optimization. This is a generalization that encompasses both the rolling-state and rolling-flexible policies. The rolling-static policy is equivalent to a rolling-flexible-0 policy because the valve states in future steps are not flexible and are set to be equal to the states in the current time step. The rolling-flexible policy is equivalent to a rolling-flexible-0 policy because the valve states in all future steps are allowed to be flexible. Although no valuation results were produced in this study for these rolling-flexible-k policies, we have examined the reduced size of the resulting state space. A rolling-flexible-1 policy requires 62,208 simulations for full enumeration, a 92% reduction is state-space size. This reduction grows exponentially with the number of periods in the problem.

1-Neighbor Approximation Policy

Our numerical tests indicate that setting k=1 usually leads to the best performance in the k-neighbor approach. FIG. 9 plots the performance of different valuation strategies under different bin sizes with learning from FOPR and FGPR, respectively. The 1-neighbor approximation policy required 12,288 simulations to be run to construct the set T, and a total of 49,152 simulations to be run to complete the optimization. This is a reduction 93.8% compared to the 786,432 simulations required by the optimal policy. The flexible policy value does not depend on bin size by definition and is a constant $418.3×106. Consistent with the discussion above, the optimal value is generally monotonically increasing with respect to smaller bin sizes. For both panels, the best performance of the optimal/approximation approach is achieved at the smallest bin size considered, where the optimal values are $422.6×106 and $422.7×106 respectively and the 1-neighbor approximate values are $420.2×106 and $421.2×106.

A comparison of these 1-neighbor approximation values (FIG. 9) with the rolling-flexible valuations in FIG. 7 for FOPR and FGPR shows that the rolling-flexible policy significantly outperforms the 1-neighbor policy in the quality of the valuation approximation, while the required number of simulations is nearly the same. The quality of the 1-neighbor approximation for small bin sizes is illustrated in FIG. 10, where the accuracy of the approximation is seen to improves significantly for very small bin sizes. This is a consequence of the high degree of clustering in the measurements. Table 3 shows a portion of the complete measurement table organized in the "multi-digit" comparison way described above. The optimal setting 82 (the last two columns) displays a significant clustering structure. Clustering is not obvious for some scenarios. But for a majority of measurements, clustering is strong. The 1-Neighbor approach exploits this clustering property to achieve near-optimal performance, but only for small bin sizes where the rolling-flexible policy also achieves good performance.

Overall, these results support a recommendation of the rolling-flexible policy in this example. In the case of very small bin size, the 1-neighbor policy becomes competitive.

The invention claimed is:
1. A computer-based method for optimizing operation of at least one oilfield device that performs an operation carried out by instructions executing on a computer, on a hydrocarbon reservoir, the performed method operation comprising:
for each given iteration t in a number of successive iterations over increasing time, performing a sequence of operations for the given iteration t that include:
(i) using at least one optimal setting for the at least one oilfield device determined from all previous iterations up to t−1 as input to a plurality of reservoir model simulations to determine forecasted oilfield measurements for the hydrocarbon reservoir, wherein the plurality of reservoir model simulations of (i) use a plurality of reservoir models that represent uncertainty associated with the hydrocarbon reservoir,
(ii) grouping the forecasted oilfield measurements into clusters, and
(iii) using the clusters of forecasted oilfield measurements to configure a plurality of reservoir model simulations to determine at least one optimal setting for the at least one oilfield device for the given iteration t, wherein
(a) the plurality of reservoir model simulations of (iii) use a plurality of reservoir models that represent uncertainty associated with the hydrocarbon reservoir and
(b) the clusters of forecasted oilfield measurements are grouped in (ii) to correspond to a partition of a state space of the plurality of reservoir model simulations of (iii); and
dynamically adjusting operation of the at least one oilfield device on the hydrocarbon reservoir to change at least one aspect of production of the hydrocarbon reservoir, wherein the dynamically adjusting uses the at least one optimal setting determined for the number of successive iterations to account for a reduction of uncertainty associated with the hydrocarbon reservoir over time.

2. The method of claim 1, wherein the forecasted oilfield measurements comprise at least one of flow measurements, pressure measurements, well log measurements, fluid production measurements, well test measurements, electromagnetic survey measurements, gravity survey measurements, nuclear survey measurements, tilt meter survey measurements, and seismic survey measurements.

3. The method of claim 1, wherein the at least one optimal setting for the at least one oilfield device is updated based on a flexible policy over the successive iterations.

4. The method of claim 1, wherein the at least one optimal setting for the at least one oilfield device is updated based on a flexible policy over a subset of the successive iterations.

5. The method of claim 1, wherein the at least one oilfield device is a valve.

6. The method of claim 1, wherein the at least one oilfield device comprises a plurality of valves.

7. The method of claim 6, wherein the plurality of valves are flow control valves.

8. The method of claim 7, wherein the flow control valves control flow of hydrocarbons from the hydrocarbon reservoir.

9. The method of claim 1, wherein the valuation of the hydrocarbon reservoir comprises payoff.

10. The method of claim 1, wherein the at least one oilfield device is installed in a well.

11. The method of claim 1, wherein the clusters of forecasted oilfield measurements are defined by equal-sized intervals.

12. The method of claim 1, wherein the clusters of forecasted oilfield measurements are defined by unequal-sized intervals.

13. The method of claim 1, wherein the configuration of the plurality of reservoir model simulations in (iii) is based on distances between different reservoir model simulation scenarios.

14. The method of claim 13, wherein the distances between different reservoir model simulation scenarios is represented by an ordered table.

15. The method of claim 14, wherein the ordered table includes multi-digit numbers that represent the different reservoir model simulation scenarios.

* * * * *